United States Patent [19]

Namba et al.

[11] Patent Number: 5,154,958
[45] Date of Patent: Oct. 13, 1992

[54] OPTICAL RECORDING MEDIUM

[75] Inventors: Kenryo Namba, Tokyo; Tetsushi Inoue, Chiba; Sumiko Kitagawa, Saitama; Masahiro Shinkai, Chiba, all of Japan

[73] Assignee: TDK Corporation, Tokyo, Japan

[21] Appl. No.: 736,976

[22] Filed: Jul. 29, 1991

[30] Foreign Application Priority Data

May 10, 1991 [JP] Japan ................ 3-135935

[51] Int. Cl.$^5$ ............................................. B32B 3/00
[52] U.S. Cl. ....................................... 428/64; 428/65; 428/156; 428/457; 428/913; 430/945; 346/76 L; 346/135.1; 369/283; 369/288
[58] Field of Search ............ 428/64, 65, 156, 457, 428/913; 346/76 L, 135.1; 369/283, 288; 430/945

[56] References Cited

U.S. PATENT DOCUMENTS

| 4,944,980 | 7/1990 | Aksutu et al. | 428/65 |
| 4,990,388 | 2/1991 | Hamada et al. | 428/65 |
| 4,994,354 | 2/1991 | Toibana et al. | 428/65 |

FOREIGN PATENT DOCUMENTS

| 60-159087 | 8/1985 | Japan | 428/64 |
| 60-162691 | 8/1985 | Japan | 428/64 |
| 60-163243 | 8/1985 | Japan | 428/64 |
| 60-203488 | 10/1985 | Japan | 428/64 |
| 2-257445 | 10/1990 | Japan | 428/64 |
| 2-48435 | 10/1991 | Japan | 428/64 |

OTHER PUBLICATIONS

The Functional Dye Department of the Kinki Chemical Society, Mar. 3, 1989.
SPIE vol. 1078; Optical Recording Topical Meeting (1989).
Nikkei Electronics; Jan. 23, 1989 (No. 465).

*Primary Examiner*—Patrick J. Ryan
*Assistant Examiner*—Elizabeth Evans
*Attorney, Agent, or Firm*—Watson, Cole, Grindle & Watson

[57] ABSTRACT

An optical recording disk comprising a grooved substrate, a dye-containing recording layer, and a reflective layer in close contact with the recording layer is recorded by directing recording light to the recording layer in the groove to form pits and reproduced by directing reproducing light to the pits. The substrate is formed of a cyclic olefin polymer. A photo-stabilized cyanine dye in the form of an indolenine cyanine dye cation-quencher anion ionic combination has relatively constant values of n and k with a variation in the wavelength of recording/reproducing light. Then the disk is resistant against light, heat and water to ensure satisfactory performance according to the CD standard.

3 Claims, 1 Drawing Sheet

OPTICAL RECORDING MEDIUM

CROSS-REFERENCE TO THE RELATED APPLICATION

Reference is made to our copending application U.S. Ser. No. 486,843 filed Mar. 1, 1990 or EPA 90 103691.3 filed Feb. 26, 1990 for "Optical Recording Medium" and U.S. Ser. No. 703,668 filed May 21, 1991 or EPA 91 108167.7 filed May 21, 1991 for "Optical Recording Medium."

FIELD OF THE INVENTION

This invention relates to an optical recording medium, and more particularly, to an optical recording medium of the write-once type intended for compact disks.

BACKGROUND OF THE INVENTION

An additionally or fully recordable optical recording disk was proposed in accordance with the compact disk (generally known as CD) standard. See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.

This disk has a dye layer, a reflective Au layer, and a protective layer disposed on a transparent resin substrate in this order. That is, the reflective layer is in close contact with the dye layer. As opposed to the prior art disk of the air sandwich structure wherein an air space is provided on a dye layer of the disk in order to allow pits to be formed in the dye layer, the newly proposed disk is of the close contact type wherein the reflective layer is close to the dye layer. The close contact type configuration could meet the total disk thickness of 1.2 mm required by the CD standard.

In the medium of the close contact type wherein a reflective layer is close to a recording layer containing a dye, the recording layer should have a coefficient of extinction k of 0.02 to 0.05 and an index of refraction n of at least 2.0 at the wavelength of the recording and reproducing light and unrecorded portions of the recording layer have a reflectivity of at least 60%, especially at least 70% to meet the CD requirement.

According to the CD standard, recording and reproducing operations rely on semiconductor laser having a wavelength of 780 nm. The oscillation wavelength varies somewhat among semiconductor laser products and is generally in the range of from about 780 to 790 nm. It also varies to the order of ±10 nm with varying temperatures.

The preferred dyes used in the recording layers are cyanine dyes of the indolenine series. Normally, indolenine cyanine dyes have a coefficient of extinction k which is so greatly dependent on wavelength that for the dye having a desired value of k at 780 nm, k would deviate off the desired range if the wavelength varies within ±10 nm.

The inventors previously proposed to mix two or more indolenine cyanine dyes for the purpose of improving the wavelength dependency of k (Japanese Patent Application No. 48435/1990). We have found that a mixture of two or more dyes has a low melting point, a broad softening point, and poor reliability as evaluated by heat resistance and humidity resistance. Only limited combinations of dyes can minimize the change of k with wavelength variations.

As is well known in the art, a dye layer used as a recording layer experiences a lowering in reproduction capability since a light absorbing dye is less resistant against light and likely to deteriorate in the photon mode upon repetitive reproduction. We proposed to use an ionic combination of a dye cation and a transition metal complex anion as a singlet oxygen quencher for the purposes of preventing output lowering and improving light resistance (Japanese Patent Application Kokai=JP-A No. 159087/1985, 162691/1985, 203488/1985, and 163243/1985). In this combination, the dye cation and the quencher anion are present in a ratio of 1:1. If a recording layer is formed from a mixture of a cation type dye and a quencher, then there are present four types of ion, a dye cation, a quencher anion and their counter ions in a ratio corresponding to the mix ratio of the dye and the quencher. This suggests that the use of an ionic combination, absent the counter ions of the dye and quencher, has the advantages of less output lowering and higher light resistance than the mix system. Moreover, many ionic combinations have a high distinct melting point whereas mix systems have a low melting point and a broad softening point, that is, poor thermal stability. In this respect, the ionic combinations are effective for reducing the reproduction deterioration of the heat mode and improving shelf stability as well as moisture resistance.

Since conventional quencher anions, however, have a high coefficient of extinction k, the use of an ionic combination in a medium of the close contact type yields a recording layer having increased k and decreased reflectivity therewith, failing to provide satisfactory reproduction. In order to control k to a desired value, another light absorbing dye having low k must be additionally mixed, leading to a lowering of light resistance and thermal stability. Therefore, the prior art close contact type media could not take advantage of the ionic combinations having high light resistance.

SUMMARY OF THE INVENTION

Therefore, an object of the present invention is to provide a reliable optical recording medium of the close contact type which ensures satisfactory recording and reproduction. Another object is to provide such an optical recording medium having heat resistance and moisture resistance as well as light resistance. A further object is to provide such an optical recording medium whose recording/reproducing performance experiences a minimal variation with a change in the wavelength of recording and reproducing light.

To attain these and other objects, the present invention provides an optical recording medium comprising a substrate having a groove formed therein, a recording layer on the substrate containing a dye, and a reflective layer stacked in close contact with the recording layer. The medium is recorded by directing recording light to the recording layer in the groove to form recorded sites and reproduced by directing reproducing light to the recorded sites. According to the feature of the present invention, the substrate is formed of a cyclic olefin polymer. The recording layer contains a photo-stabilized cyanine dye of the formula:

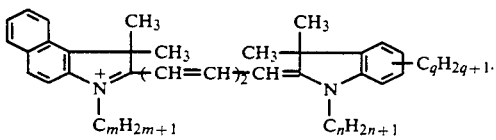

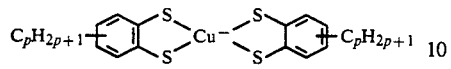

wherein m and n are positive integers, m > n and m ≥ 2, q is 0 or a positive integer of up to 10, and p is a positive integer of from 1 to 10. The recording layer has a thickness of 2,000 to 3,000 Å in the groove. In a preferred embodiment, the groove has a width of 0.38 to 0.50 μm.

BRIEF DESCRIPTION OF THE DRAWING

The only figure.

DESCRIPTION OF THE PREFERRED EMBODIMENTS

Figure 1:
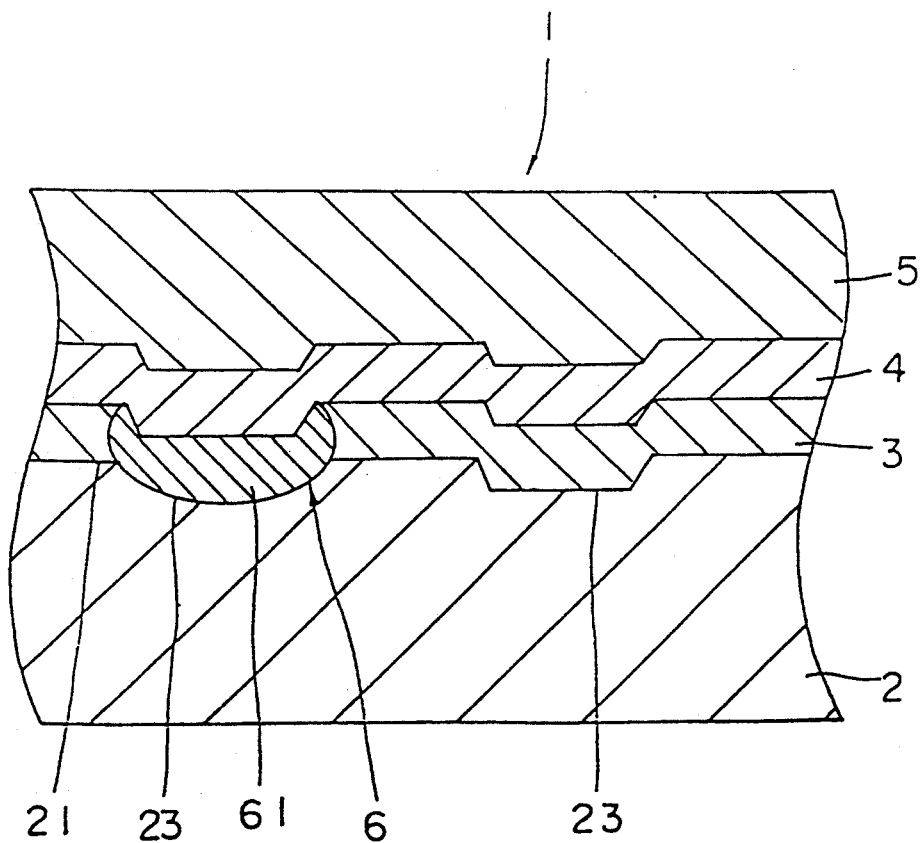
FIG. 1 is a fragmental cross-sectional view of an optical recording disk according to one preferred embodiment of the invention.

Referring to FIG. 1, there is illustrated in cross section a portion of an optical recording medium generally designated at 1 according to one preferred embodiment of the invention. The medium 1 is an optical recording disk of the close contact type including a substrate 2, a dye-containing recording layer 3 on the substrate, and a reflective layer 4 and a protective layer 5 on the recording layer 3 in close arrangement.

Substrate

The substrate 2 is of disk shape having commonly used dimensions, for example, a thickness of about 1.2 mm and a diameter of about 80 or 120 mm according to the CD standard.

The substrate 2 is formed of a material which is substantially transparent to recording and reproducing light, typically a semiconductor laser beam having a wavelength of 600 to 900 nm, especially 700 to 800 nm, most often 780 nm. The substrate material preferably has a transmittance of at least 80% so that recording and reproducing operation can be made through the substrate 2, that is, from the rear side of the substrate 2 remote from the recording layer 3.

For the purpose of preventing output lowering and photo-degradation during light room storage, the substrate is formed of a resin, more specifically a cyclic polyolefin polymer. The cyclic polyolefin polymer preferably has recurring units of the formula:

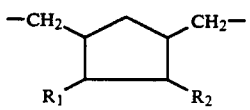

wherein $R_1$ and $R_2$ are hydrocarbon groups, preferably unsubstituted alkyl groups having 1 to 5 carbon atoms. Preferred cyclic polyolefin polymers are homopolymers consisting of recurring units of formula (II) although copolymers comprising recurring units of formula (II) wherein $R_1$ and $R_2$ groups are different are acceptable. They preferably have a number average molecular weight of about 10,000 to about 100,000, more preferably about 20,000 to about 50,000. These cyclic polyolefins may be prepared through polymerization in a conventional manner or are commercially available in the trade name of Zeonex 280 from Nihon Zeon K.K., for example.

Another preferred group of cyclic olefin polymer is a copolymer of ethylene with a cyclic olefin of the formula:

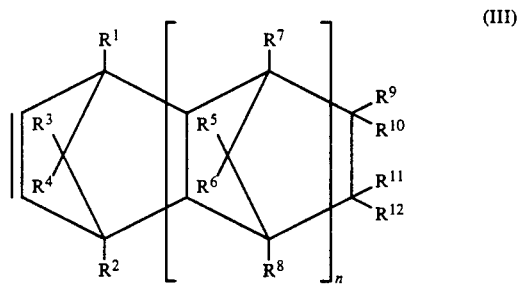

wherein n is 0 or a positive integer, $R^1$ through $R^{12}$ are independently selected from the group consisting of a hydrogen atom, halogen atom, and hydrocarbon group, and $R^9$ through $R^{12}$, taken together, may form a mono or polycyclic group which may have a double bond, or $R^9$ and $R^{10}$ or $R^{11}$ and $R^{12}$, taken together, may form an alkylidene group. A blend of such copolymers is also acceptable. For the details of these copolymers, reference is made to JP-A 257446/1990. The cyclic olefins of formula (III) may be synthesized by condensing cyclopentadienes and corresponding olefins by Diels-Alder reaction.

Illustrative, non-limiting examples of the cyclic olefin of formula (III) include octahydronaphthalenes such as tetracyclo[4,4,0,1$^{2,5}$,1$^{7,10}$]-3-dodecene(1,4,5,8-dimethano-1,2,3,4,4a,5,8,8a-octahydronaphthalene),
2-methyl-1,4,5,8-dimethano-1,2,3,4,4a,5, 8, 8a-octahydronaphthalene,
2-ethyl1,4,5,8-dimethano-1,2,3,4,4a,5,8,8a-octahydronaphthalene,
2-propyl-1,4,5,8-dimethano-1,2,3,4,4a,5,8,8a-ocatahydronaphthalene,
2-hexyl-1,4,5,8-dimethano-1,2,3,4,4a,5,8,8a-ocatahydronaphthalene,
2,3-dimethyl-1,4,5,8-dimethano-1,2,3,4,4a,5,8,8a-ocatahydronaphthalene,
2-methyl-3-ethyl-1,4,5,8-dimethano-1,2,3,4,4a,5,8,8a-ocatahydronaphthalene,
2-chloro-1,4,5,8-dimethano-1,2,3,4,4a,5,8,8a-ocatahydronaphthalene,
2-bromo-1,4,5,8-dimethano-1,2,3,4,4a,5,8,8a-ocatahydronaphthalene,
2-fluoro-1,4,5,8-dimethano-1,2,3,4,4a,5,8,8a-ocatahydronaphthalene,
2,3-dichloro-1,4,5,8-dimethano-1,2,3,4,4a,5,8,8a-ocatahydronaphthalene,
2-cyclohexyl-1,4,5,8-dimethano-1,2,3,4,4a,5,8,8a-ocatahydronaphthalene,
2-n-butyl-1,4,5,8-dimethano-1,2,3,4,4a,5,8,8a-ocatahydronaphthalene,
2-isobutyl-1,4,5,8-dimethano-1,2,3,4,4a,5,8,8a-ocatahydro naphthalene, etc.

Other examples of the cyclic olefin of formula (III) include
bicyclo[2,2,1]hept-2-ene derivatives such as bicyclo[2,2,1]hept-2-ene,
6-methylbicyclo[2,2,1]hept-2-ene,
5,6-dimethylbicyclo[2,2,1]hept-2-ene, 1-methylbicyclo[2,2,1]hept-2-ene,
6-ethylbicyclo[2,2,1]hept-2-ene,
6-n-butylbicyclo[2,2,1]hept-2-ene,
6-isobutylbicyclo[2,2,1]hept-2-ene,
7-methylbicyclo[2,2,1]hept-2-ene, etc.;
tetracyclo[4,4,0,1$^{2,5}$,1$^{7,10}$]-3-dodecene derivatives such as
tetracyclo[4,4,0,1$^{2,5}$,1$^{7,10}$]-3-dodecene,
5,10-dimethyltetracyclo[4,4,0,1$^{2,5}$,1$^{7,10}$]-3dodecene,
2,10-dimethyltetracyclo[4,4,0,1$^{2,5}$,1$^{7,10}$]-3-dodecene,
11,12-dimethyltetracyclo[4,4,0,1$^{2,5}$,1$^{7,10}$]-3-dodecene,
2,7,9-trimethyltetracyclo[4,4,0,1$^{2,5}$,1$^{7,10}$]-3-dodecene,
9-ethyl-2,7-dimethyltetracyclo[4,4,0,1$^{2,5}$,1$^{7,10}$]-3-dodecene,
9-isobutyl-2,7-dimethyltetracyclo[4.4,0:1$^{2,5}$,1$^{7,10}$]-3-dodecene,
9,11,12-trimethyltetracyclo[4,4,0,1$^{2,5}$,1$^{7,10}$]-3-dodecene,
9-ethyl-11,12-dimethyltetracyclo[4,4,0,1$^{2,5}$,1$^{7,10}$]-3-dodecene,
9-isobutyl-11,12-dimethyltetracyclo[4,4,0,1$^{2,5}$,1$^{7,10}$]-3-dodecene,
5,8,9,10-tetramethyltetracyclo[4,4,0,1$^{2,5}$,1$^{7,10}$]-3-dodecene,
8-methyltetracyclo[4,4,0,1$^{2,5}$,1$^{7,10}$]-3-dodecene,
8-ethyltetracyclo[4,4,0,1$^{2,5}$,1$^{7,10}$]-3-dodecene,
8-propyltetracyclo[4,4,0,1$^{2,5}$,1$^{7,10}$]-3-dodecene,
8-hexyltetracyclo[4,4,0,1$^{2,5}$,1$^{7,10}$]-3-dodecene,
8-stearyltetracyclo[4,4,0,1$^{2,5}$,1$^{7,10}$]-3-dodecene,
8,9-dimethyltetracyclo[4,4,0,1$^{2,5}$,1$^{7,10}$]-3-dodecene,
8-methyl-9-ethyltetracyclo[4,4,0,1$^{2,5}$,1$^{7,10}$]-3-dodecene,
8-chlorotetracyclo[4,4,0,1$^{2,5}$,1$^{7,10}$]-3-dodecene,
8-bromotetracyclo[4,4,0,1$^{2,5}$,1$^{7,10}$]-3-dodecene,
8-fluorotetracyclo[4,4,0,1$^{2,5}$,1$^{7,10}$]-3-dodecene,
8,9-dichlorotetracyclo[4,4,0,1$^{2,5}$,1$^{7,10}$]-3-dodecene,
8-cyclohexyltetracyclo[4,4,0,1$^{2,5}$,1$^{7,1}$]-3-dodecene,
8-isobutyltetracyclo[4,4,0,1$^{2,5}$,1$^{7,10}$]-3-dodecene,
8-butyltetracyclo[4,4,0,1$^{2,5}$,1$^{7,10}$]-3-dodecene,
8-ethylidenetetracyclo[4,4,0,1$^{2,5}$,1$^{7,10}$1]-3-dodecene,
8-ethylidene-9-methyltetracyclo[4,4,0,1$^{2,5}$,1$^{7,10}$]-3-dodecene,
8-ethylidene-9-ethyltetracyclo[4,4,0,1$^{2,5}$,1$^{7,10}$]-3-dodecene,
8-ethylidene-9isopropyltetracyclo[4,4,0,1$^{2,5}$,1$^{7,10}$]-3-dodecene,
8-ethylidene-9-butyltetracyclo[4,4,0,1$^{2,5}$,1$^{7,10}$]-3-dodecene,
8-n-propylidenetetracyclo[4,4,0,1$^{2,5}$,1$^{7,10}$]-3-dodecene,
8-n-propylidene-9-methyltetracyclo[4,4,0,1$^{2,5}$,1$^{7,10}$]-3-dodecene,
8-n-propylidene-9-ethyltetracyclo[4,4,0,1$^{2,5}$,1$^{7,10}$]-3-dodecene,
8-n-propylidene-9-isopropyltetracyclo[4,4,0,1$^{2,5}$,1$^{7,10}$]-3-dodecene,
8-n-propylidene-9-butyltetracyclo[4,4,0,1$^{2,5}$,1$^{7,10}$]-3-dodecene,
8-isopropylidenetetracyclo[4,4,0,1$^{2,5}$,1$^{7,10}$]-3-dodecene,
8-isopropylidene-9-methyltetracyclo[4,4,0,1$^{2,5}$,1$^{7,10}$]-3-dodecene,
8-isopropylidene-9-ethyltetracyclo[4,4,0,1$^{2,5}$,1$^{7,10}$]-3-dodecene,
8-isopropylidene-9-isopropyltetracyclo[4,4,0,1$^{2,5}$,1$^{7,10}$]-3-dodecene,
8-isopropylidene-9-butyltetracyclo[4,4,0,1$^{2,5}$,1$^{7,10}$]-3-dodecene, etc.;
hexacyclo[6,6,1,1$^{3,6}$,1$^{10,13}$,0$^{2,7}$,0$^{9,14}$]-4-heptadecene derivatives such as
hexacyclo[6,6,1,1$^{3,6}$,1$^{10,13}$,0$^{2,7}$,0$^{9,14}$]-4-heptadecene,
2-methylhexacyclo[6,6,1,1$^{3,6}$,1$^{10,13}$,0$^{2,7}$,0$^{9,14}$]-4-heptadecene,
12-ethylhexacyclo[6,6,1,1$^{3,6}$,1$^{10,13}$,0$^{2,7}$,0$^{9,14}$]-4-heptadecene,
12-isobutylhexacyclo[6,6,1,1$^{3,6}$,1$^{10,13}$,0$^{2,7}$,0$^{9,14}$]-4heptadecene,
1,6,10-trimethyl-12-isobutylhexacyclo[6,6,1,1$^{3,6}$,1$^{10,13}$,0$^{2,7}$,0$^{9,14}$]-4-heptadecene, etc.;
octacyclo[8,8,0,1$^{2,9}$,1$^{4,7}$,1$^{11,18}$,1$^{13,16}$,0$^{3,8}$,0$^{12,17}$]-5-dococene derivatives such as
octacyclo[8,8,0,1$^{2,9}$,1$^{4,7}$,1$^{11,18}$,1$^{13,16}$,0$^{3,8}$,0$^{12,17}$]-5-dococene,
15-methyloctacyclo[8,8,0,1$^{2,9}$,1$^{4,7}$,1$^{11,18}$,1$^{13,16}$,0$^{3,8}$,0$^{12,17}$]-5-dococene,
15-ethyloctacyclo[8,8,0,1$^{2,9}$,1$^{4,7}$,1$^{11,18}$,1$^{13,16}$,0$^{3,8}$,0$^{12,17}$]-5-dococene, etc.;
pentacyclo[6,6,1,1$^{3,6}$,0$^{2,7}$,0$^{9,14}$]-4-hexadecene derivatives such as
pentacyclo[6,6,1,1$^{3,6}$,0$^{2,7}$,0$^{9,14}$]-4-hexadecene,
1,3-dimethylpentacyclo[6,6,1,1$^{3,6}$,0$^{2,7}$,0$^{9,14}$]-4-hexadecene,
1,6-dimethylpentacyclo[6,6,1,1$^{3,6}$,0$^{2,7}$,0$^{9,14}$]-4-hexadecene,
15,16-dimethylpentacyclo[6,6,1,1$^{3,6}$,0$^{2,7}$,0$^{9,14}$]-4-hexadecene, etc.;
heptacyclo-5-icosene derivatives and heptacyclo-5-heneicosene derivatives such as
heptacyclo[8,7,0,1$^{2,9}$,1$^{4,7}$,1$^{11,17}$,0$^{3,8}$,0$^{12,16}$]-5-icosene,
heptacyclo[8,7,0,1$^{2,9}$,1$^{4,7}$,1$^{11,17}$,0$^{3,8}$,0$^{12,16}$]-5-heneicosene, etc.;
tricyclo[4,3,0,1$^{2,5}$]-3-decene derivatives such as tricyclo[4,3,0,1$^{2,5}$]-3-decene,
2-methyltricyclo[4,3,0,1$^{2,5}$]-3-decene,
5-methyltricyclo[4,3,0,1$^{2,5}$]-3-decene, etc.;
tricyclo[4,4,0,1$^{2,5}$]-3-undecene derivatives such as tricyclo[4,4,0,1$^{2,5}$]-3-undecene,
10-methyltricyclo[4,4,0,1$^{2,5}$]-3-undecene, etc.;
pentacyclo[6,5,1,1$^{3,6}$,0$^{2,7}$,0$^{9,13}$]-4-pentadecene derivatives such as
pentacyclo[6,5,1,1$^{3,6}$,0$^{2,7}$,0$^{9,13}$]-4-pentadecene,
1,3-dimethylpentacyclo[6,5,1,1$^{3,6}$,0$^{2,7}$,0$^{9,13}$]-4-pentadecene,
1,6-dimethylpentacyclo[6,5,1,1$^{3,6}$,0$^{2,7}$,0$^{9,13}$]-4-pentadecene,
14,15-dimethylpentacyclo[6,5,1,1$^{3,6}$,0$^{2,7}$,0$^{9,13}$]-4-pentadecene, etc.;
pentacyclo[6,5,1,1$^{3,6}$,0$^{2,7}$,0$^{9,13}$]-4,10-pentadecadiene derivatives;
pentacyclo[4,7,0,1$^{2,5}$,0$^{8,13}$,0$^{9,12}$]-3-pentadecene derivatives such as
pentacyclo[4,7,0,1$^{2,5}$,0$^{8,13}$,0$^{9,12}$]-3-pentadecene,
methyl-substituted pentacyclo[4,7,0,1$^{2,5}$,0$^{8,13}$,0$^{9,12}$]-3-pentadecene, etc.;
heptacyclo[7,8,0,1$^{3,6}$,0$^{2,7}$,1$^{10,17}$,0$^{11,16}$,1$^{12,15}$]-4-eicosene derivatives such as
heptacyclo[7,8,0,1$^{3,6}$,0$^{2,7}$,1$^{10,17}$,0$^{11,16}$,1$^{12,15}$]-4-eicosene,
dimethyl-substituted heptacyclo[7,8,0,1$^{3,6}$,0$^{2,7}$,1$^{10,17}$,0$^{11,16}$,1$^{12,15}$]-4-eicosene, etc.;
nonacyclo[9,10,1,1$^{4,7}$,0$^{3,8}$,0$^{2,10}$,0$^{12,21}$,1$^{13,20}$,0$^{14,19}$,1$^{15,18}$]-5-pentacosene derivatives such as
nonacyclo[9,10,1,1$^{4,7}$,0$^{3,8}$,0$^{2,10}$,0$^{12,21}$,1$^{13,20}$,0$^{14,19}$,1$^{15,18}$]-5-pentacosene,
trimethyl-substituted nonacyclo[9,10,1,1$^{4,7}$,0$^{3,8}$,0$^{2,10}$,0$^{12,21}$,1$^{13,20}$, 0$^{14,19}$,1$^{15,18}$]-5-pentacosene, etc.

The cyclic olefin polymers are essentially composed of ethylene and cyclic olefins of formula (III) and optionally, another copolymerizable unsaturated monomeric component. Such optional monomers include α-olefins having 3 to 20 carbon atoms, for example, propylene, 1-butene, 4-methyl-1-pentene, 1-hexene, 1-decene, 1-dodecene, 1-tetradecene, 1-hexadecene, 1-ocatadecene, and 1-eicosene.

The cyclic olefin polymers may be used alone or in admixture of two or more to form substrates. Copolymers of at least one cyclic olefin may be prepared under suitably selected conditions by such methods as disclosed in JP-A 68708/1985, 120816/1986, 115912/1986, 115916/1986, 71308/1986, and 272216/1986 and Japanese Patent Application Nos. 95905/1986 and 90906/1986.

Included are random copolymers of cyclic olefins, homopolymers and copolymers containing recurring units obtained through ring-opening polymerization of cyclic olefins of formula (III), and homopolymers and copolymers containing such, but hydrogenated recurring units.

Anti-oxidants, stabilizers and other additives may be incorporated in the cyclic olefin polymers.

Substrates are prepared by injection molding the cyclic olefin polymers in a conventional manner. If desired, the substrate may be formed with an oxygen-impermeable coating on at least one of its upper and lower surfaces and optionally, on the inner and outer periphery surfaces.

On the surface of the substrate 2 where the recording layer 3 is formed, the upper surface in the illustrated embodiment, a groove 23 is formed for tracking purposes. The tracking groove 23 preferably consists of continuous spiral turns. Typically, the groove 23 has a depth of 0.1 to 0.25 μm and a width of 0.38 to 0.50 μm (width in a radial direction with respect to the disk center). The adjoining turns 23 are separated by a land at a pitch of 1.5 to 1.7 μm. With this groove configuration, tracking signals can be obtained without reducing the reflection level of the groove. It is important to limit the groove width to the range of 0.38 to 0.50 μm because with a width of less than 0.38 μm, tracking signals of less intensity would be obtained and a slight tracking offset induced during recording would result in a larger magnitude of jitter. A width in excess of 0.50 μm tends to cause distortion of reproduced signal waveform, resulting in an increase in crosstalk.

Where the groove is formed in the surface of the substrate, a provision is preferably made such that recording light is directed to a recording layer within the groove. That is, the optical recording medium of the invention is preferably of the groove recording mode. The groove recording mode allows the recording layer to have an increased effective thickness.

Recording layer

The recording layer 3 is formed on the grooved substrate 2 using a photo-stabilized cyanine dye of formula (I), that is, an ionic combination or ionically bonded compound of a cyanine dye cation and a quencher anion as a light absorbing dye.

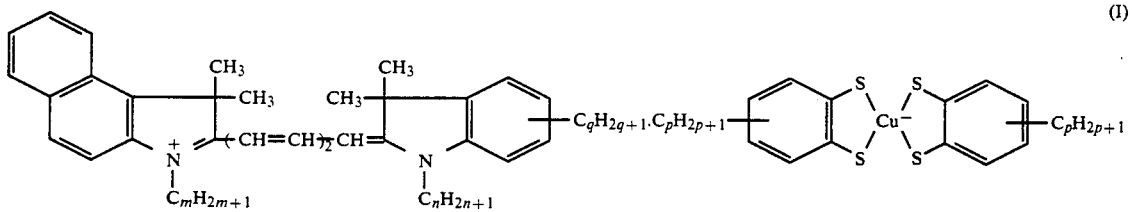

(I)

In formula (I), the cyanine dye cation is of the indolenine series having a pentamethine chain and has an assymmetric heteronucleus structure in which one nucleus is a 4,5-benzoindolenine ring and the other nucleus is an indolenine ring. The alkyl group $C_nH_{2n+1}$ attached to the nitrogen atom of the 4,5-benzoindolenine ring and the alkyl group $C_mH_{2m+1}$ attached to the nitrogen atom of the indolenine ring are preferably both straight chains, but different from each other so that m>n. Letter m is a positive integer of at least 2, preferably 2 to 10, more preferably 2 to 5 and n is a positive integer smaller than the value of m, more preferably of 1 to 3. To the benzene ring of the indolenine ring may be attached an alkyl group $C_qH_{2q+1}$. This alkyl group is preferably attached to the indolenine ring at the 5-position. Letter q is equal to 0 (that is, H) or a positive integer of 1 to 10, preferably 1 to 3.

The counterpart, quencher anion is a copper complex of bis-1,2-phenylenedithiol. To the phenylenedithiol, preferably at the 4-position, is attached an alkyl group $C_pH_{2p+1}$. Letter p is a positive integer of from 1 to 10, preferably equal to 3, that is, the preferred alkyl is a tertiary butyl group (abbreviated as tBu).

Illustrative preferred, non-limiting examples of the photo-stabilized cyanine dye are given below.

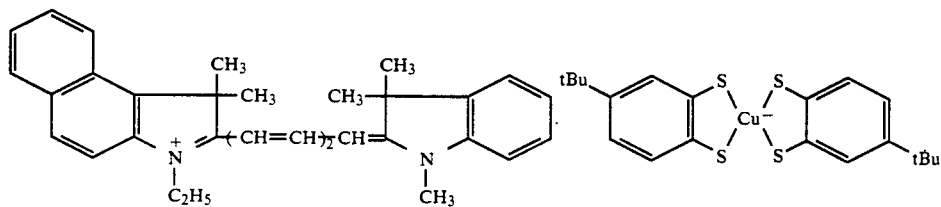

D 1

-continued

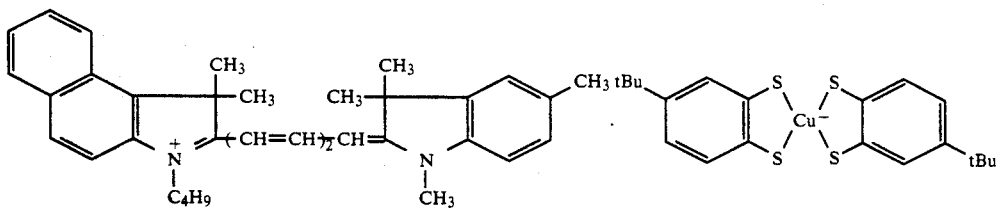
D 2

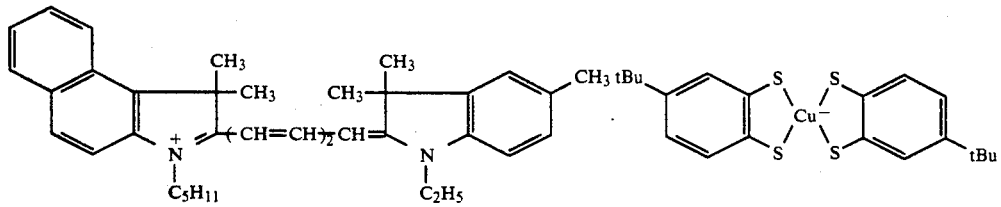
D 3

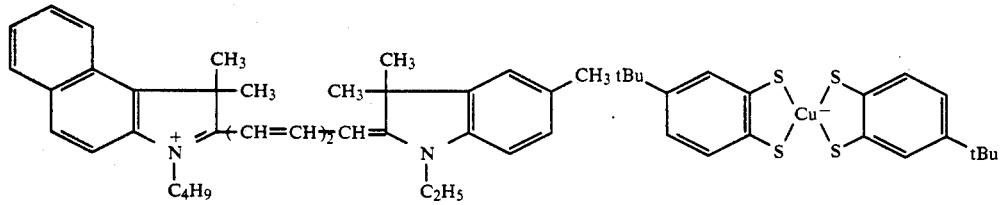
D 4

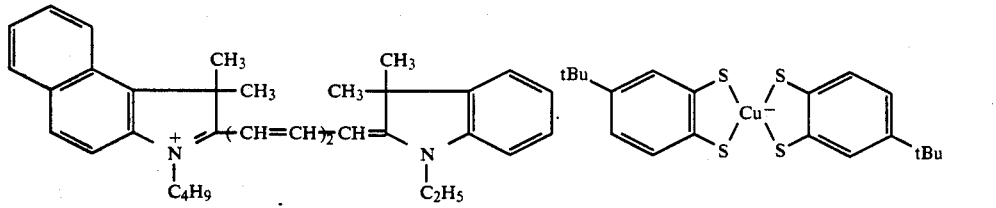
D 5

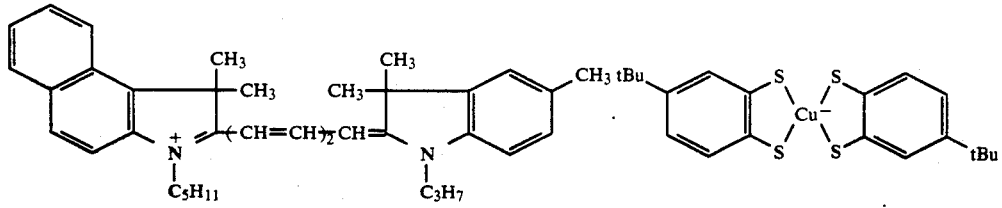
D 6

The recording layer may contain at least 50% by weight, preferably 60 to 100% by weight of the photo-stabilized cyanine dye while any other dye(s) and singlet oxygen quencher(s) may be co-present.

The photo-stablilized cyanine dyes of formula (I) have n and k which are less dependent on the light wavelength and exhibit a minimal change of n and k over the range of from 770 to 810 nm while they are very resistant against light.

Due to the presence of the photo-stablilized cyanine dye, the recording layer 3 has a coefficient of extinction (the imaginary part of a complex index of refraction) k of from 0.02 to 0.05 at the wavelength of recording and reproducing light. With a coefficient of extinction k of less than 0.02, the recording layer can have a lower absorptivity so that it might become difficult to record with a commonly used power A coefficient of extinction k of more than 0.05 can result in a drop of reflectivity to below 70%, often failing to reproduce according to the CD standard.

The recording layer preferably has an index of refraction (the real part of a complex index of refraction) n of from 2.0 to 2.6 at the wavelength of recording and reproducing light. With n<2.0, the reflectivity and reproduced signal therewith would be reduced, often failing to reproduce according to the CD standard.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168–178.

It will be understood that the photo-stablilized cyanine dyes according to the present invention have maximum absorption at a wavelength in the range of 650 to 750 nm.

In the practice of the invention, the recording layer 3 is often formed by coating a solution of the dye. To form the recording layer by coating, the solvent may be selected from ketones such as cyclohexanone since the cyclic olefin polymer of which the substrate 2 is formed has improved solvent resistance. Spin coating is a typical coating technique.

As previously mentioned, the portion of the recording layer 3 disposed within the confine of the groove 23 forms a recording track. The recording layer 3 preferably has a thickness of about 2,000 to about 3,000 Å in the groove 23. Recording layers of less than 2,000 Å thick would produce tracking signals of less intensity whereas in excess of 3,000 Å, a drop of reflectivity would result in an increase in crosstalk and jitter.

On the land between the grooves 23 the recording layer has a thickness of about 1,200 to about 1,700 Å. This thickness profile of the recording layer would provide tracking signals of an appropriate magnitude for the push-pull tracking control. The groove in the substrate desirably has a depth of about 1,500 to about 2,000 Å.

Reflective layer

The reflective layer 4 is applied to the recording layer 3 in direct contact therewith. Any desired high reflectivity material, for example, Au, Ag, Cu and the like and alloys thereof may be used to form the reflective layer.

The reflective layer 4 preferably has a thickness of at least about 500 Å. It can be formed by evaporation or sputtering. Although no upper limit is generally imposed on the thickness of the reflective layer, a thickness of up to about 1,200 Å is preferred for manufacturing cost and time. The reflective layer alone has a reflectivity of at least 90%, and the reflectivity of an unrecorded portion of the medium through the substrate can be at least 60%, especially at least 70%.

Protective layer

The protective layer 5 may be formed on the reflective layer 4. The protective layer may be formed from any desired resin material such as a UV-curable resin, usually to a thickness of about 0.5 to 100 μm. The protective layer may be either a layer or a sheet.

The protective layer is preferably prepared by coating a composition of a radiation-curable compound and a photopolymerization sensitizer and curing the coating with radiation.

Preferably, the protective layer has a hardness in the range of H to 8H, especially 2H to 7H in pencil hardness at 25° C. according to JIS K-5400. This hardness range leads to an improved eye pattern and a substantial reduction of jitter. In addition, the protective layer will not separate Q from the underlying reflective layer during shelf storage under high-temperature, high-humidity conditions or varying temperature and humidity conditions. More specifically, the eye pattern can be disturbed and the jitter can increase if the protective layer is softer than pencil hardness H. A protective layer harder than 8H becomes brittle and difficult to form or does not fully adhere to the underlying reflective layer.

The radiation curable compounds used in forming the protective layer include oligoester acrylates. The oligoester acrylates are oligoester compounds having at least two acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups. In addition to or instead of the oligoester acrylates, there may be used radiation curable compounds in the form of thermoplastic resins modified to be radiation sensitive.

The protective layer of such a radiation-curable compound preferably has a thickness of from about 0.5 to 30 μm, more preferably from about 1 to 10 μm. A protective layer of thinner than 0.5 μm is often difficult to form uniformly and insufficient as a moisture barrier in a humid atmosphere so that the underlying recording layer becomes less durable. Jitter prevention also becomes insufficient. A protective layer thicker than 30 μm tends to invite distortion of the overall recording medium and cracking of the protective layer itself due to shrinkage upon curing.

The protective layer may be formed by any desired well-known technique, for example, spinner coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred. For UV curing, a photopolymerization sensitizer is generally added to the radiation-curable compounds. As the photopolymerization sensitizer, any well-known compounds may be used, for example, benzoins such as benzoin methyl ether, benzoin ethyl ether, α-methylbenzoin, and α-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and mercury discharge lamps are used. If desired, electron radiation may be used.

Operation

Recording or additional recording may be carried out on the optical recording medium 1 of the above-described construction by directing recording light having a wavelength of 780 nm, for example, in pulse form to the recording layer 3 in the groove 23 through the substrate 2 to form a pit 6. The recording layer 3 absorbs light so that it is heated while the substrate 2 is heated at the same time. As a result, the recording material, typically dye melts or decomposes near the interface between the substrate 2 and the recording layer 3, applying a pressure to the interface between the substrate 2 and the recording layer 3 to deform the side walls of the groove 23.

The melted or decomposed products of the recording material leave a mass 61 on the bottom of the groove 23. Since the decomposed mass 61 somewhat invades the substrate side so that the pit 6 is larger in dimensions than the originally confined geometry of the recording layer. The decomposed mass 61 consists essentially of the decomposed product of the recording material or a mixture of the decomposed product of the recording material and the recording material, but does not substantially contain the substrate material.

It is to be noted that the recording light has a power of about 5 to 9 mW while the substrate is rotated at a linear velocity of about 1.2 to 1.4 m/sec.

After the micro recorded sites or pits 6 are formed in this way, reproducing light having a wavelength of 780 nm and a power of about 0.1 to 1.0 mW is directed to the pits 6 through the substrate 2. The pits cause a phase difference to reduce the reflectivity to not greater than 40%, preferably not greater than 20% of the reflectivity of unrecorded portions. In turn, the remaining recording layer, that is, the unrecorded portions maintain a high reflectivity of at least 60%, especially at least 70%. This differential reflectivity enables reproduction according to the CD standard.

EXAMPLE

Examples of the present invention are given below by way of illustration and not by way of limitation.

Example 1

There were prepared pellets of a cyclic polyolefin consisting of recurring units of formula (II) wherein $R_1=R_2=$ethyl, that is, 1,4-dimethylene-2,3-diethylcyclopentane and having a molecular weight of 29,000 (designated Polyolefin 1). The pellets were melted at 350° C. and injection molded at a mold temperature of 100° C. and an injection pressure of 350 kg/cm$^2$ to form a substrate having a diameter of 120 mm and a thickness of 1.2 mm. The substrate had a continuous spiral groove with a pitch of 1.6 μm, a width of 0.42 μm, and a depth of 0.2 μm.

A recording layer containing photo-stablilized cyanine dye D1 was formed on the substrate by spin coating a solution of 3.5% by weight of the dye in cyclohexanone. After drying, the dye layer had a thickness of 2,500 Å in the groove and 1,400 Å on the land.

The recording layer was measured for index of refraction (n) and coefficient of extinction (k) at a wavelength in the range of 770 to 790 nm. The results are shown in Table 1. For n and k measurements, a solution containing the dye was applied to a test substrate to a dry coating thickness of 1,000 to 1,500 Å and the resulting recording layer was measured for n and k. These measurements were made according to the procedure of K. Ishiguro, "Optics," Kyoritsu Publishing K.K., pages 168–178.

Further, gold was sputtered on the recording layer to form a reflective layer having a thickness of 1,000 Å. Still further, a UV-curable resin composition containing an oligoester acrylate was coated on the reflective layer and UV cured to form a protective layer. That is, a UV-curable resin composition containing an oligoester acrylate and a photopolymerization sensitizer was spinner coated and irradiated with UV radiation at 120 W/cm for 15 seconds for crosslinking curing. The cured film or protective layer had a pencil hardness of 2H and a thickness of 5 μm. There was completed an optical recording disk sample designated No. 1.

CD signals were recorded in the sample disk using a laser beam having a wavelength of 780 nm and a power of 7 mW. Then reproduction was carried out with a commercial CD player. Disk sample No. 1 showed satisfactory results. The reflectivity of unrecorded portion was higher than 70%, and the reflectivity of recorded portion was less than 40% of the reflectivity of unrecorded portion. Jitter was low enough.

The sample was examined for light resistance. On test is a light room storage test in which the sample was exposed to a Xe lamp at 80,000 lux for 100 hours. After 100-hour light exposure, little change was found in reflectivity. Another test is a simulated reproduction test in which the sample was exposed to 10$^6$ pulses of reproducing light at 780 nm and 0.8 mW. At the end of test, no change was found in reflectivity.

For examining heat and humidity resistance, the sample was stored for 500 hours at 80° C. and relative humidity 80% and thereafter, measured how a C1 error would increase. No error increase was found.

These results are shown in Table 1.

TABLE 1

| Sample No. | Substrate | Dye | n at 770 nm | n at 780 nm | n at 790 nm | k at 770 nm | k at 780 nm | k at 790 nm | Light resistance reproducing pulses | Light resistance light storage (hour) | Heat/humid resistance 80° C./RH 80%/500 hr. |
| --- | --- | --- | --- | --- | --- | --- | --- | --- | --- | --- | --- |
| 1 | Polyolefin 1 | D1 | 2.30 | 2.28 | 2.22 | 0.05 | 0.03 | 0.025 | >10$^6$ | 100 | Pass |
| 2* | Polyolefin 1 | D'1 | 2.2 | 2.0 | 1.9 | 0.06 | 0.04 | 0.02 | >10$^6$ | 100 | Pass |
| 3* | Polyolefin 1 | D'2 | 2.5 | 2.5 | 2.45 | 0.01 | 0.01 | 0.01 | (low recording sensitivity) | | |
| 4* | Polyolefin 1 | D'3 | 2.2 | 2.1 | 2.1 | 0.06 | 0.08 | 0.09 | (low reflectivity) | | |
| 5* | Polyolefin 1 | D'4 + Q | 2.0 | 1.9 | 1.9 | 0.04 | 0.02 | 0.025 | ~3 × 10$^5$ | 30 | Rejected |
| 6* | Polycarbonate | D1 | — | — | — | — | — | — | >10$^6$ | 50 | Fair |
| 7* | PMMA | D1 | — | — | — | — | — | — | >10$^6$ | 50 | Fair |
| 8 | Polyolefin 2 | D1 | — | — | — | — | — | — | >10$^6$ | 100 | Pass |

*comparison

Equivalent results were obtained with photo-stablilized cyanine dyes D2 through D6.

Comparative Examples 1–4

Optical recording disk sample Nos. 2 to 5 were prepared by the same procedure as in Example 1 except that photostabilized cyanine dye D1 was replaced by comparative dyes D'1, D'2, D'3, and D'4+Q which are identified below.

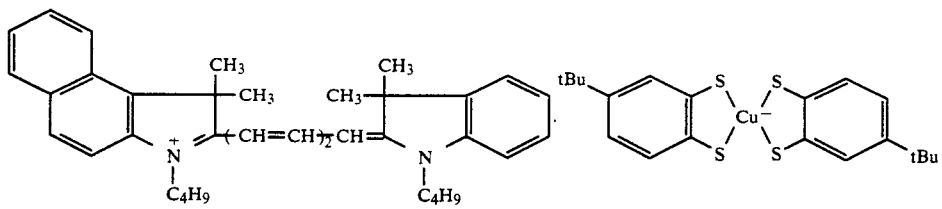

D' 1

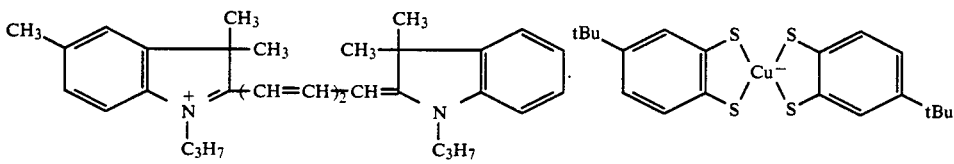

D' 2

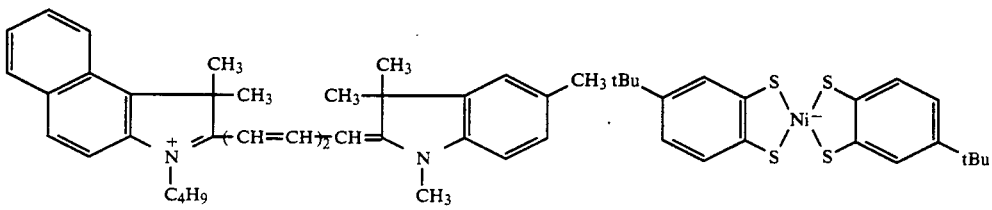

D' 3

(50 wt %)

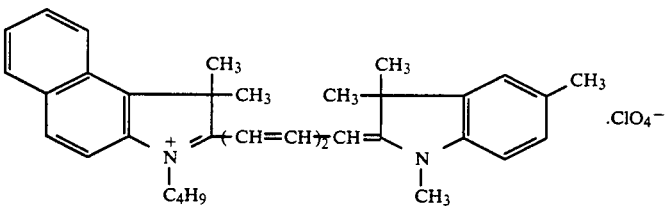

D' 4

÷Q (50 wt %)

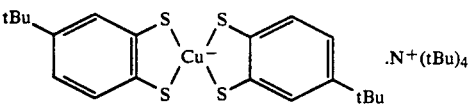

The results are also shown in Table 1 so that the benefits of the present invention are readily understood.

Comparative Examples 5-6

Optical recording disk sample Nos. 6 and 7 were prepared by the same procedure as in Example 1 except that instead of the cyclic olefin polymer, the substrates were formed of polycarbonate and PMMA by casting. The results are also shown in Table 1.

Comparative Example 7

An optical recording disk sample was prepared by the same procedure as in Example 1 except that the spin coating conditions were changed so as to give a recording layer having a thickness of 1,900 Å in the groove. This disk sample developed signals of insufficient magnitude to reproduce.

A sample in which the recording layer had a thickness of 3,100 Å in the groove was similarly prepared to find an increase in jitter and crosstalk.

It was also found in connection with Example 1 that a sample in which only the groove width was changed to 0.36 μm showed poor tracking control and a loss of recording sensitivity. A sample in which only the groove width was changed to 0.52 μm reproduced signals of distorted waveform with an increase of crosstalk.

Example 2

Two copolymers having different copolymerization ratios were obtained by random polymerizing ethylene and tetracyclo[4,4,0,1$^{2,5}$,1$^{7,10}$]-3-dodecene (abbreviated as DMON) in accordance with the disclosure of JP-A 168708/1985. A blend of the two copolymers (designated Polyolefin 2) was melted at 350° C. and injection molded at a mold temperature of 100° C. and an injection pressure of 350 kg/cm$^2$ to form substrates having a diameter of 120 mm and a thickness of 1.2 mm. The substrates had a continuous spiral groove with the same parameters as in Example 1. Then an optical recording disk sample No. 8 was prepared in the same manner as in Example 1. The results are also shown in Table 1.

As seen from the data of Table 1, recording layers containing the photo-stablilized cyanine dyes as defined herein as the light absorbing dye have less wavelength-dependent values of n and k and are resistant against light, heat and humidity, ensuring satisfactory recording/reproducing properties.

There has been described an optical recording medium having a recording layer containing a specific photostabilized cyanine dye capable of satisfactory optical recording and reproduction according to the CD standard because of high reflectivity and a great lowering of reflectivity in pits. The recording layer has less wavelength-dependent values of n and k so that little change occurs in recording/reproducing performance regardless of a variation in the wavelength of recording/reproducing light. Also a well confined pit configuration and a high S/N ratio insure satisfactory recording/reproducing performance. Great improvements in heat resistance, humidity or water resistance, and light resistance minimize the degradation encountered on reproduction and during storage in a light room.

While we have shown and described particular embodiments of our invention, it will be obvious to those skilled in the art that various changes and modifications may be made without departing from the invention in its broader aspects.

We claim:

1. In an optical recording medium comprising a substrate having a groove formed therein, a recording layer on the substrate containing a dye, and a reflective layer stacked in close contact with the recording layer, wherein the medium is recorded by directing recording light to the recording layer in the groove to form recorded sites and reproduced by directing reproducing light to the recorded sites, the improvement wherein said substrate is formed of a cyclic olefin polymer, said recording layer contains a photo-stabilized cyanine dye of the formula:

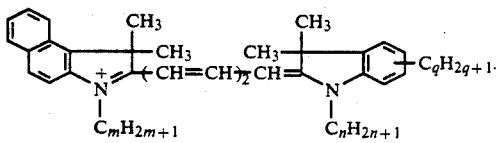

-continued

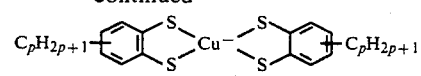

wherein m and n are positive integers, $m > n$ and $m \geq 2$, q is 0 or a positive integer of up to 10, and p is a positive integer of from 1 to 10, and said recording layer has a thickness of 2,000 to 3,000 Å in the groove having a width of 0.38 to 0.50 μm.

2. The optical recording medium of claim 1 wherein said cyclic olefin polymer has recurring units of the formula:

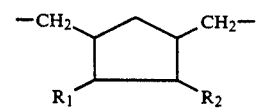

wherein $R_1$ and $R_2$ are hydrocarbon groups.

3. The optical recording medium of claim 1 wherein said cyclic olefin polymer is a copolymer of ethylene with a cyclic olefin of the formula:

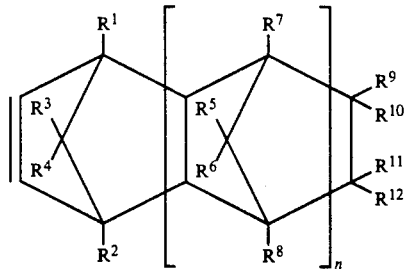

wherein n is 0 or a positive integer, $R^1$ and $R^{12}$ are independently selected from the group consisting of a hydrogen atom, halogen atom, and hydrocarbon group, and $R^9$ through $R^{12}$, taken together, may form a mono- or polycyclic group which may have a double bond, or $R^9$ and $R^{10}$ or $R^{11}$ and $R^{12}$ may form an alkylidene group.

* * * * *